US012680831B2

(12) United States Patent
Wang et al.

(10) Patent No.: US 12,680,831 B2
(45) Date of Patent: Jul. 14, 2026

(54) GRID-BASED CODING OF TERRAIN MAPS FOR LOCALIZATION

(71) Applicant: National Technology & Engineering Solutions of Sandia, LLC, Albuquerque, NM (US)

(72) Inventors: Felix Wang, Albuquerque, NM (US); James Bradley Aimone, Keller, TX (US)

(73) Assignee: National Technology & Engineering Solutions of Sandia, LLC, Albuquerque, NM (US)

( * ) Notice: Subject to any disclaimer, the term of this patent is extended or adjusted under 35 U.S.C. 154(b) by 534 days.

(21) Appl. No.: 18/127,830

(22) Filed: Mar. 29, 2023

(65) Prior Publication Data

US 2024/0328821 A1      Oct. 3, 2024

(51) Int. Cl.
G01C 21/00          (2006.01)

(52) U.S. Cl.
CPC .................................. G01C 21/387 (2020.08)

(58) Field of Classification Search
CPC .......................... G01C 21/387; G01C 21/3881
See application file for complete search history.

(56) References Cited

U.S. PATENT DOCUMENTS 8,326,399 B2 * 12/2012 Gurr ...................... G01R 33/54
                                                   600/407

FOREIGN PATENT DOCUMENTS

CN          112017288 A  * 12/2020  ............. G06T 17/05

* cited by examiner

*Primary Examiner* — Anne Marie Antonucci
*Assistant Examiner* — Jewel A Kuntz
(74) *Attorney, Agent, or Firm* — Yee & Associates, P.C.; Greg Doudnkikoff; Merle W. Richman

(57) ABSTRACT

Encoding terrain maps is provided. The method comprises receiving a digital elevation model (DEM) of a terrain and encoding the DEM into grid cells parameterized by spatial scale, orientation, and 2D offset. Grid cells with shared scale and orientation are aggregated into grid modules. Locations from the DEM that correspond to a given elevation produce a contour line of locations that fall within the given elevation. 2D phase codes are calculated for each grid module to produce a phase candidate dictionary, wherein a subset of phase codes comprises phase candidates corresponding to locations from the contour line. When sensor data is received along a trajectory over the terrain, the phase candidate dictionary is queried. Phase candidates are corrected for relative displacement from a reference point and summed to produce a coincidence map over the DEM that identifies a current location estimate over the terrain.

20 Claims, 17 Drawing Sheets

PHASE ESTIMATES

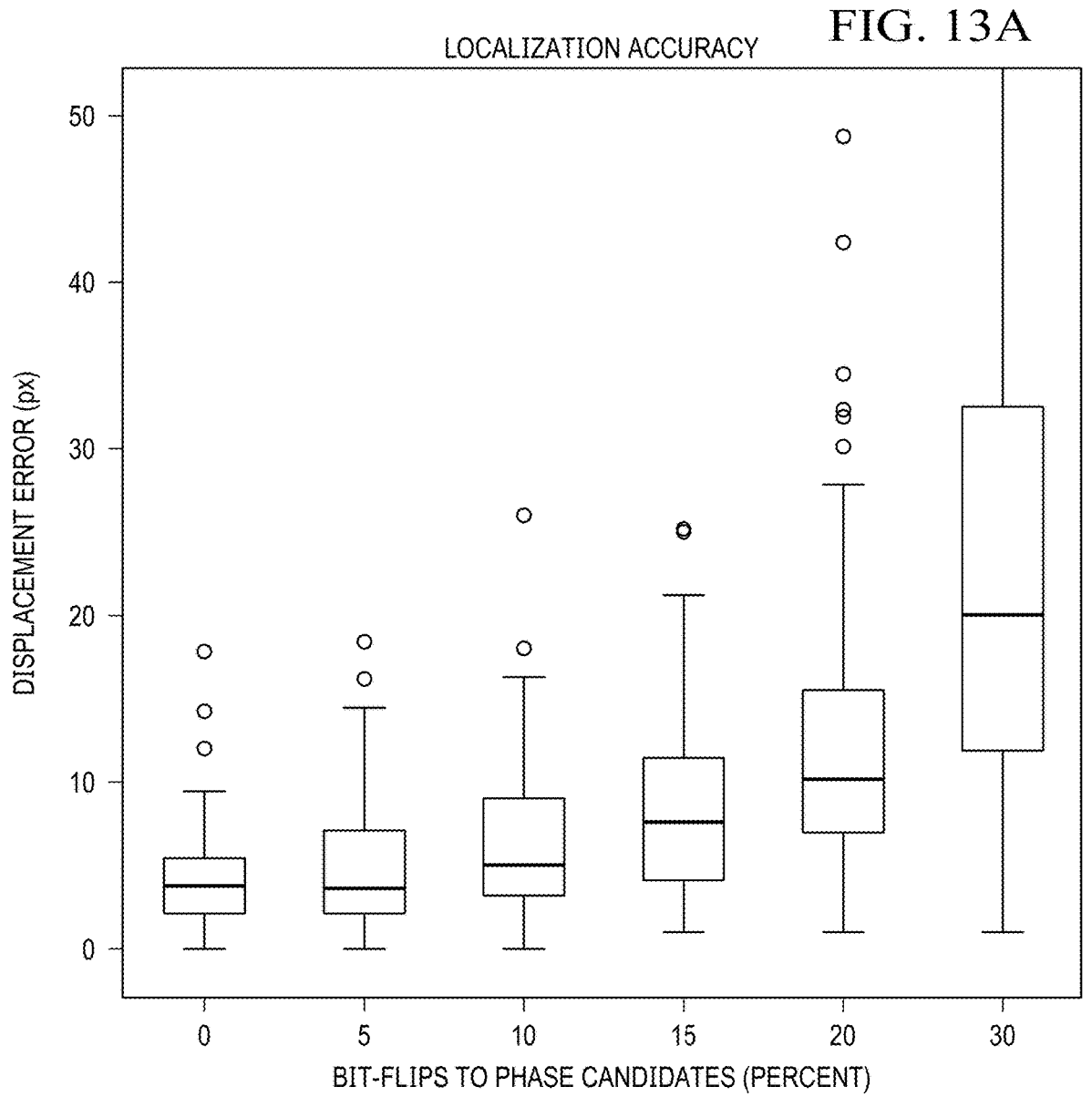
LOCALIZATION ACCURACY      FIG. 13A

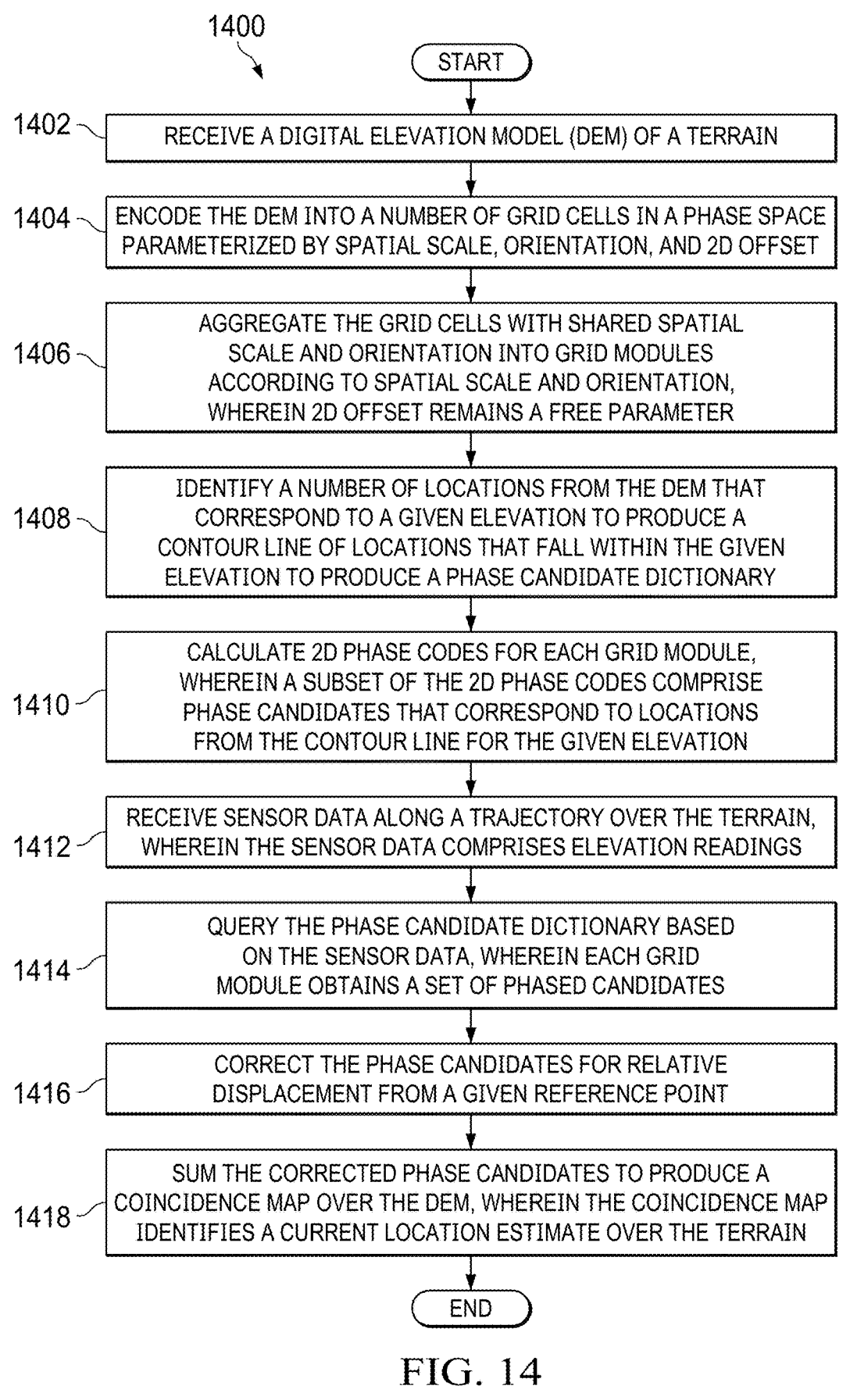

1400

```
                    ( START )
                        │
                        ▼
1402 ──┤ RECEIVE A DIGITAL ELEVATION MODEL (DEM) OF A TERRAIN │
                        │
                        ▼
1404 ──┤ ENCODE THE DEM INTO A NUMBER OF GRID CELLS IN A PHASE SPACE
         PARAMETERIZED BY SPATIAL SCALE, ORIENTATION, AND 2D OFFSET │
                        │
                        ▼
1406 ──┤ AGGREGATE THE GRID CELLS WITH SHARED SPATIAL
         SCALE AND ORIENTATION INTO GRID MODULES
         ACCORDING TO SPATIAL SCALE AND ORIENTATION,
         WHEREIN 2D OFFSET REMAINS A FREE PARAMETER │
                        │
                        ▼
1408 ──┤ IDENTIFY A NUMBER OF LOCATIONS FROM THE DEM THAT
         CORRESPOND TO A GIVEN ELEVATION TO PRODUCE A
         CONTOUR LINE OF LOCATIONS THAT FALL WITHIN THE GIVEN
         ELEVATION TO PRODUCE A PHASE CANDIDATE DICTIONARY │
                        │
                        ▼
1410 ──┤ CALCULATE 2D PHASE CODES FOR EACH GRID MODULE,
         WHEREIN A SUBSET OF THE 2D PHASE CODES COMPRISE
         PHASE CANDIDATES THAT CORRESPOND TO LOCATIONS
         FROM THE CONTOUR LINE FOR THE GIVEN ELEVATION │
                        │
                        ▼
1412 ──┤ RECEIVE SENSOR DATA ALONG A TRAJECTORY OVER THE TERRAIN,
         WHEREIN THE SENSOR DATA COMPRISES ELEVATION READINGS │
                        │
                        ▼
1414 ──┤ QUERY THE PHASE CANDIDATE DICTIONARY BASED
         ON THE SENSOR DATA, WHEREIN EACH GRID
         MODULE OBTAINS A SET OF PHASED CANDIDATES │
                        │
                        ▼
1416 ──┤ CORRECT THE PHASE CANDIDATES FOR RELATIVE
         DISPLACEMENT FROM A GIVEN REFERENCE POINT │
                        │
                        ▼
1418 ──┤ SUM THE CORRECTED PHASE CANDIDATES TO PRODUCE A
         COINCIDENCE MAP OVER THE DEM, WHEREIN THE COINCIDENCE MAP
         IDENTIFIES A CURRENT LOCATION ESTIMATE OVER THE TERRAIN │
                        │
                        ▼
                    ( END )
```

FIG. 14

GRID-BASED CODING OF TERRAIN MAPS FOR LOCALIZATION

STATEMENT OF GOVERNMENT INTEREST

This invention was made with United States Government support under Contract No. DE-NA0003525 between National Technology & Engineering Solutions of Sandia, LLC and the United States Department of Energy. The United States Government has certain rights in this invention.

BACKGROUND

1. Field

The present disclosure relates generally to terrain maps, and more specifically, to digital elevation models.

2. Background

Grid cells are one of several types of hippocampal cells located in the medial entorhinal cortex (mEC) that have been implicated in spatial navigation. They are characterized by their hexagonal firing pattern and may be organized into modules that share the same spatial scaling between peaks in firing activity and orientation with respect to the direction of the tiling. Individual grid cells within a module correspond to an offset or "phase" relative to each other and may be organized in a periodic manner over a torus.

As compared to the Cartesian coordinate system for representing space, where a location is specified on the real number line along a few orthogonal dimensions, the representation provided by grid cell activity is not only periodic, but also highly distributed in nature with an overcomplete basis set. There has been work in converting between the two representations. For example, if one considers the coordinate transform for one dimension, one might take the modulo remainder of a single point with respect to a set of integers starting from different offsets from the origin.

Furthermore, the intersection of activity from multiple grid modules can be decoded to a unique location. Such a coding scheme has a robustness comparable to error correcting codes.

Therefore, it would be desirable to have a method and apparatus that take into account at least some of the issues discussed above, as well as other possible issues.

SUMMARY

An illustrative embodiment provides a computer-implemented method of encoding terrain maps. The method comprises receiving a digital elevation model (DEM) of a terrain and encoding the DEM into a number of grid cells in a phase space parameterized by spatial scale, orientation, and 2D offset. Grid cells with shared spatial scale and orientation are aggregated into grid modules, wherein 2D offset remains a free parameter. A number of locations from the DEM that correspond to a given elevation are identified to produce a contour line of locations that fall within the given elevation. 2D phase codes are calculated for each grid module to produce a phase candidate dictionary, wherein a subset of phase codes comprises phase candidates that correspond to locations from the contour line for the given elevation. Sensor data comprising elevation readings is received along a trajectory over the terrain. The phase candidate dictionary is queried based on the sensor data, wherein each grid module obtains a set of phase candidates. The phase candidates are corrected for relative displacement from a given reference point and summed to produce a coincidence map over the DEM, wherein the coincidence map identifies a current location estimate over the terrain.

Another illustrative embodiment provides a system for encoding terrain maps. The system comprises a storage device that stores program instructions and one or more processors operably connected to the storage device and configured to execute the program instructions to cause the system to: receive a digital elevation model (DEM) of a terrain; encode the DEM into a number of grid cells in a phase space parameterized by spatial scale, orientation, and 2D offset; aggregate grid cells with shared spatial scale and orientation into grid modules, wherein 2D offset remains a free parameter; identify a number of locations from the DEM that correspond to a given elevation to produce a contour line of locations that fall within the given elevation; calculate 2D phase codes for each grid module to produce a phase candidate dictionary, wherein a subset of the 2D phase codes comprise phase candidates that correspond to locations from the contour line for the given elevation; receive sensor data along a trajectory over the terrain, wherein the sensor data comprises elevation readings; query the phase candidate dictionary based on the sensor data, wherein each grid module obtains a set of phase candidates; correct the phase candidates for relative displacement from a given reference point; and sum the corrected phase candidates to produce a coincidence map over the DEM, wherein the coincidence map identifies a current location estimate over the terrain.

Another illustrative embodiment provides a computer program product for encoding terrain maps. The computer program product comprises a computer-readable storage medium having program instructions embodied thereon to perform the steps of: receiving a digital elevation model (DEM) of a terrain; encoding the DEM into a number of grid cells in a phase space parameterized by spatial scale, orientation, and 2D offset; aggregating grid cells with shared spatial scale and orientation into grid modules, wherein 2D offset remains a free parameter; identifying a number of locations from the DEM that correspond to a given elevation to produce a contour line of locations that fall within the given elevation; calculating 2D phase codes for each grid module to produce a phase candidate dictionary, wherein a subset of the 2D phase codes comprise phase candidates that correspond to locations from the contour line for the given elevation; receiving sensor data along a trajectory over the terrain, wherein the sensor data comprises elevation readings; querying the phase candidate dictionary based on the sensor data, wherein each grid module obtains a set of phase candidates; correcting the phase candidates for relative displacement from a given reference point; and summing the corrected phase candidates to produce a coincidence map over the DEM, wherein the coincidence map identifies a current location estimate over the terrain.

The features and functions can be achieved independently in various examples of the present disclosure or may be combined in yet other examples in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

FIG. 13A illustrates displacement error distribution of location estimated relative to bit-flips;

FIG. 14 depicts a flowchart illustrating a process for encoding terrain maps in accordance with an illustrative embodiment.

DETAILED DESCRIPTION

The illustrative embodiments recognize and take into account one or more different considerations. The illustrative embodiments recognize and take into account that it has been demonstrated that grid cells in the brain are encoding physical locations using hexagonally spaced, periodic phase-space representations. Such a representation may be computationally advantageous for related engineering applications.

The illustrative embodiments also recognize and take into account that theories of how the brain decodes from a phase-space representation have been developed based on neuroscience data. However, theories of how sensory information is encoded into this phase space are less certain.

The illustrative embodiments provide a method for mapping a navigation-relevant input space such as elevation trajectories into a phase-space coordinate system that can be decoded using previously developed theories. The algorithm for such mapping may also be mapped onto neuromorphic systems. Just as animals can tell where they are in a local region based on where they have been, the encoding algorithm of the illustrative embodiments enables the localization to a position in space by integrating measurements from a trajectory over a map.

Figure 1:
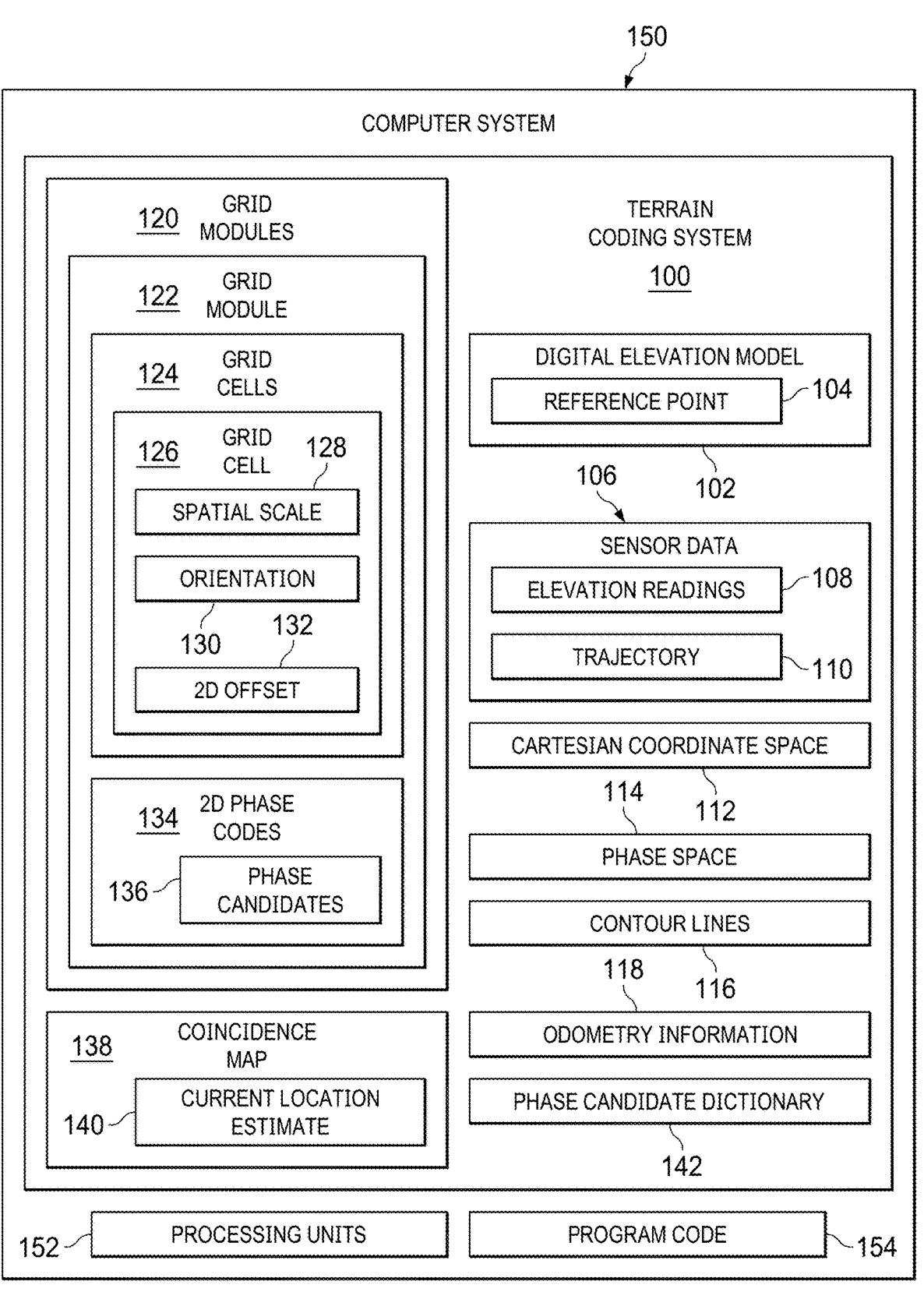
FIG. 1 depicts a block diagram of a terrain coding system in accordance with an illustrative embodiment.

FIG. 1 depicts a block diagram of a terrain coding system in accordance with an illustrative embodiment. Terrain coding system 100 operates with reference to a digital elevation model (DEM) 102 for a specified terrain. Sensor data 106, e.g., supplied by an aircraft, is compared to DEM 102 to estimate a current location over the specified terrain. In more traditional terrain-aided navigation methods, the DEM 102 is carried onboard the aircraft (e.g., stored in memory). When implemented in a neuromorphic algorithm, DEM 102 is distributed across a phase candidate dictionary 142 and no longer needs to be carried onboard. Rather, the DEM 102 and its contour lines 116 may be used "offline." Sensor data comprises a number of elevation readings 108 along a trajectory 110.

Terrain coding system 100 maps the sensor data 106 from a Cartesian coordinate space 112 to a phase space 114, producing a number of grid cells 124. Each grid cell 126 in grid cells 124 is parameterized according to spatial scale 128, orientation 130, and 2D offset 132.

Grid cells 124 are grouped into a number of grid modules 120. Each grid module 122 comprises grid cells 124 that share the same spatial scale 128 and orientation 130. A number of 2D phase codes 134 may be calculated for each grid module 122. A subset of the phase codes 134 that comprise phase candidates 136 that correspond to locations from a contour line 116 for a given elevation in DEM 102.

By correcting the phase candidates 136 for relative displacement from a given reference point 104 in DEM and summing the corrected phase candidates 136, terrain coding system 100 is able to construct a coincidence map 138 to overlay on DEM 102, which allows determination of a current location estimate 140 of the source (i.e., aircraft) of sensor data 106.

In the illustrative examples, the hardware can take a form selected from at least one of a circuit system, an integrated circuit, an application specific integrated circuit (ASIC), a programmable logic device, or some other suitable type of hardware configured to perform a number of operations. With a programmable logic device, the device can be configured to perform the number of operations. The device can be reconfigured at a later time or can be permanently configured to perform the number of operations. Programmable logic devices include, for example, a programmable logic array, a programmable array logic, a field programmable logic array, a field programmable gate array, and other suitable hardware devices. Additionally, the processes can be implemented in organic components integrated with inorganic components and can be comprised entirely of organic components excluding a human being. For example, the processes can be implemented as circuits in organic semiconductors.

Computer system 150 is a physical hardware system and includes one or more data processing systems. When more than one data processing system is present in computer system 150, those data processing systems are in communication with each other using a communications medium. The communications medium can be a network. The data processing systems can be selected from at least one of a computer, a server computer, a tablet computer, or some other suitable data processing system.

As depicted, computer system 150 includes a number of processor units 152 that are capable of executing program code 154 implementing processes in the illustrative examples. As used herein, a processor unit in the number of processor units 152 is a hardware device and is comprised of hardware circuits such as those on an integrated circuit that respond and process instructions and program code that operate a computer. When a number of processor units 152 execute program code 154 for a process, the number of processor units 152 is one or more processor units that can be on the same computer or on different computers. In other words, the process can be distributed between processor units on the same or different computers in a computer system. Further, the number of processor units 152 can be of the same type or different type of processor units. For example, a number of processor units can be selected from at least one of a single core processor, a dual-core processor, a multi-processor core, a general-purpose central processing unit (CPU), a graphics processing unit (GPU), a digital signal processor (DSP), or some other type of processor unit.

In the context of spatial navigation, the illustrative embodiments address the problem of localizing from sensor data along a trajectory taken by an agent over a terrain. For this, we use the reference map datasets provided through the USGS 3D Elevation Program, which supplies latitude, longitude, and elevation data points formatted as digital elevation models (DEMs). An illustration of this problem statement can be seen in FIG. 2 where the information provided to the agent is a sequence of elevations, and the objective is to estimate the location at the end of the trajectory (marked by an 'X').

Figure 3:
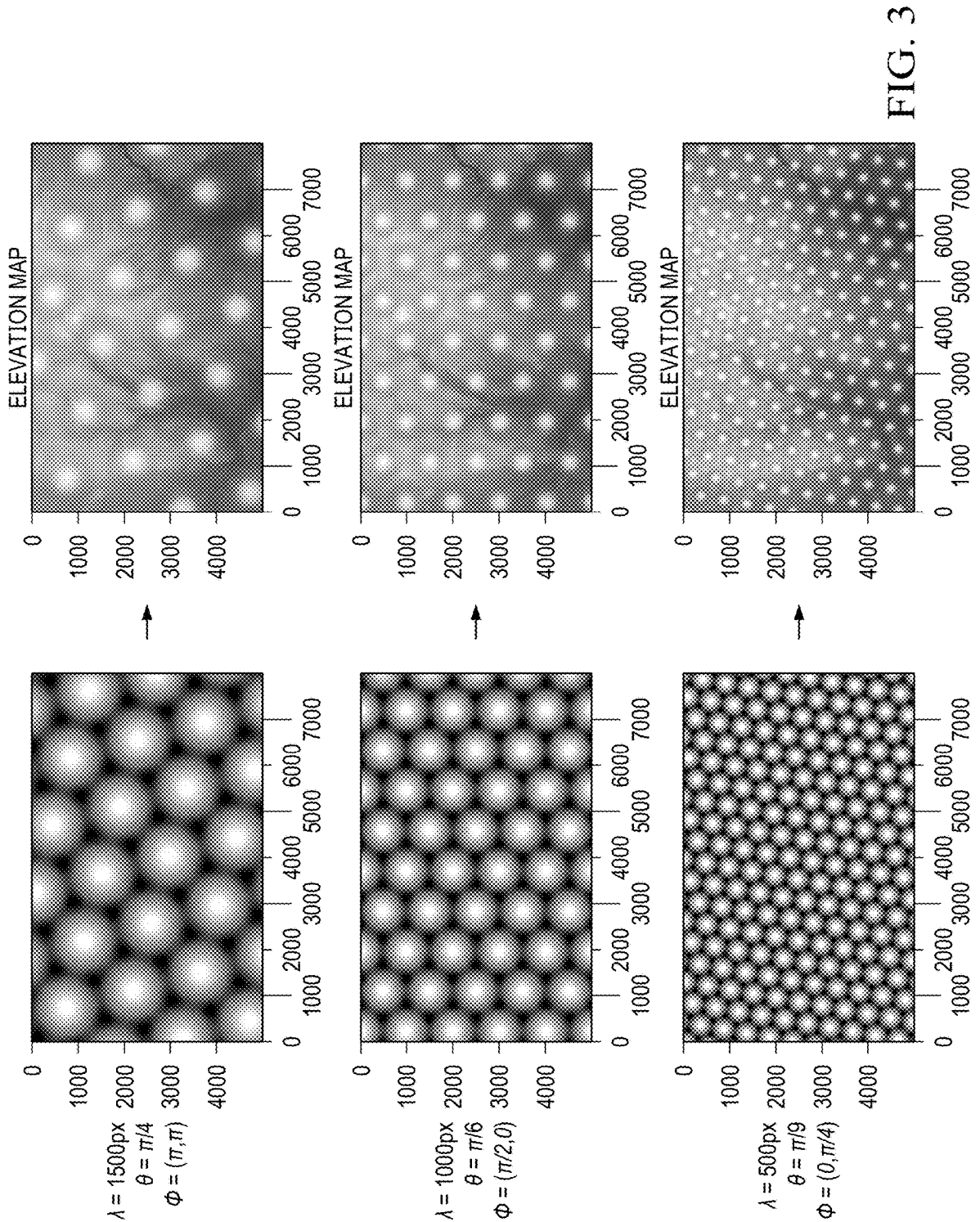
FIG. 3 illustrates overlay of a set of grid modules over the digital elevation model with specified offsets in accordance with an illustrating embodiment.

The standard Cartesian coordinates are encoded with respect to the DEM onto a grid-based representation. This encoding is performed by specifying a set of grid modules over the DEM, shown in FIG. 3. The process begins by considering grid cell activity patterns, using a formulation which parameterizes activity by spatial scale, $\lambda$, orientation, $\theta$, and 2-dimensional (2D) offset, $\phi$. Examples of grid cell activity patterns are shown in the left column of FIG. 3. From their biological inspiration, these correspond to cells that are active (e.g., spike/fire at a higher-than-baseline rate) for certain locations than others, and this activity (with respect to locations) follows a hexagonal pattern. The grid cells may be abstracted as functional/computational units that exhibit hexagonal activity patterns. These units can be grouped by their activity patterns. These activity patterns are not the product of mapping, but rather, once fixed/overlaid onto the Cartesian DEM, these activity patterns can be used to map between Cartesian and phase space(s) through Eq. 1 (see below).

The grid cells are then aggregated into grid modules that share the same spatial scale and orientation, with the free parameter being the offset, $\phi$. Because the activity patterns are periodic, the offsets may be scaled to phases on a torus, $\phi \in [0, 2\pi)^2$, with the reference point of (0, 0) as the top-left corner of the DEM. Refinement of grid-based representation from individual grid cell activations to grid module phase codes enables greater representation and more tractable computation.

For encoding, a given location (represented as an x,y-coordinate) is mapped to grid module (with shared spatial scale and orientation). The algorithm finds the unique 2D phase code (represented as a transformed x',y'-phase) corresponding to where the offset activity pattern aligns with location. This unique 2D phase code is computed by performing an affine/shear-like transform per grid module (Equation 1), followed by a modulo operation (Equation 2), which orthogonalizes the x,y-coordinate with respect to each grid module basis.

$$(x_i', y_i') = \begin{bmatrix} \cos(\theta_i) & -\sin\left(\theta_i + \frac{\pi}{6}\right) \\ \sin(\theta_i) & \cos\left(\theta_i + \frac{\pi}{6}\right) \end{bmatrix}(x, y) \qquad \text{Eq. 1}$$

$$\phi_x^i = (x_i' \bmod \lambda_i) * \left(\frac{2\pi}{\lambda_i}\right) \qquad \text{Eq. 2}$$

$$\phi_y^i = (y_i' \bmod \lambda_i) * \left(\frac{2\pi}{\lambda_i}\right)$$

Figure 4:
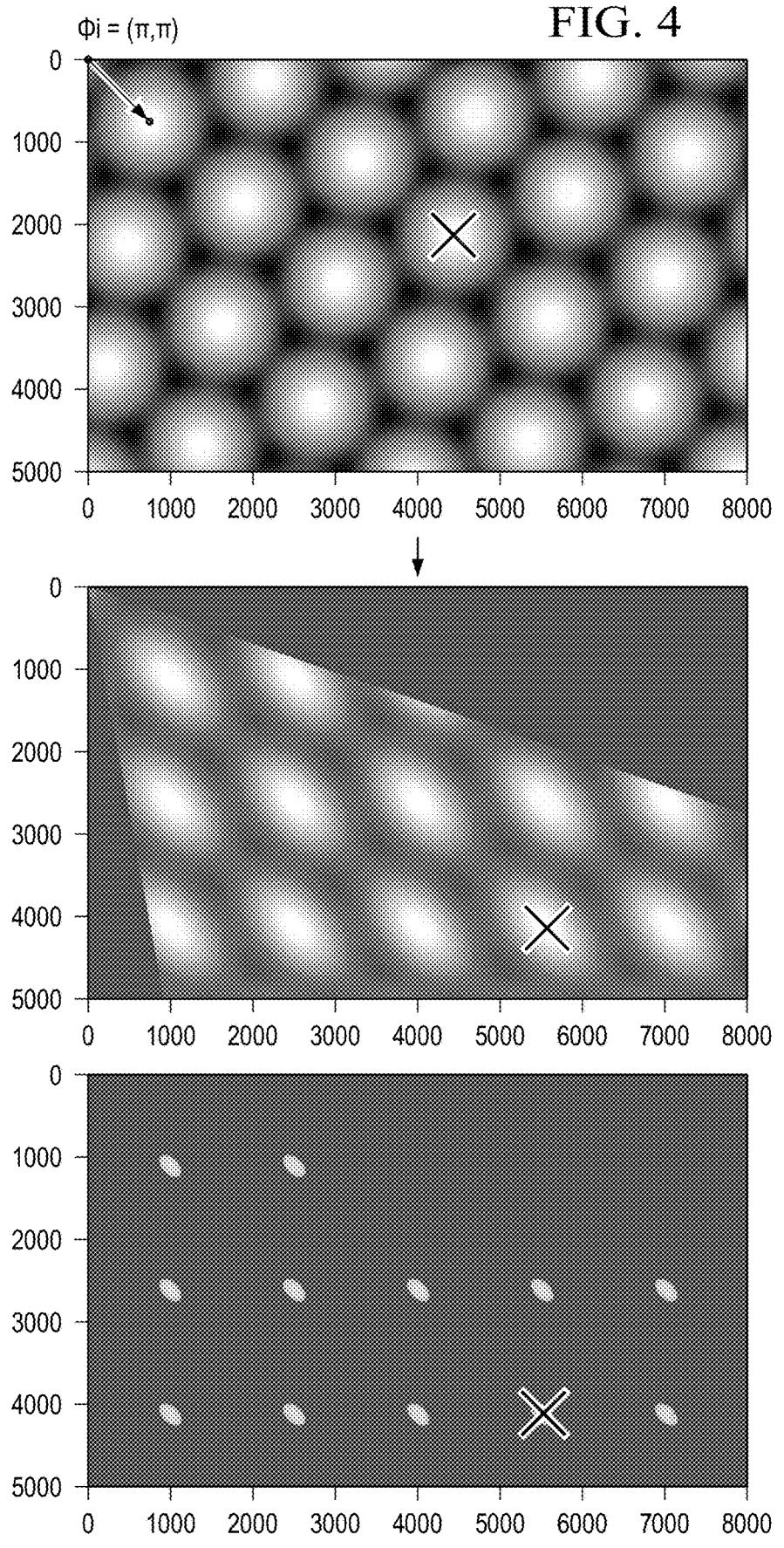
FIG. 4 illustrates a sample grid cell activation transformed into orthogonalized space and thresholded image for clarity in accordance with an illustrative embodiment.

FIG. 4 illustrates a sample grid cell activation transformed into orthogonalized space, and a thresholded image for clarity.

Figure 5:
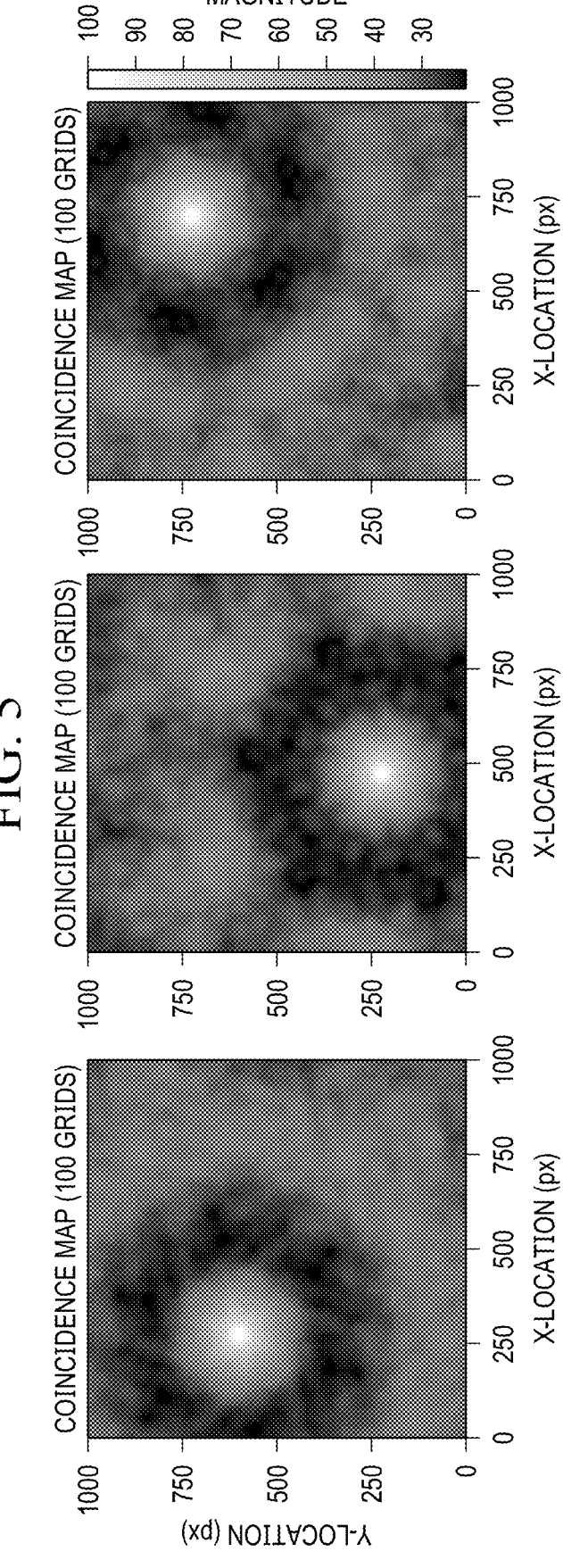
FIG. 5 depicts an illustration of coincidence maps found by summing grid activity patterns from phase code of arbitrary locations in accordance with an illustrative embodiment.

FIG. 5 depicts an illustration of coincidence maps found by summing grid activity patterns from phase code of arbitrary locations. Given the phase codes from several grid modules, it is possible to decode back to the original location in Cartesian coordinates by finding their common intersection with respect to the activity patterns. This process is performed by simply summing over the activity patterns per grid module which have been offset from the reference point as a function of its phase code. This computation is scalable, wherein only a subset of grid modules is required for successful decoding, and grid modules can be encoded/trained independently. The resulting summation over the DEM is called a coincidence map because the decoded location is identified as the point where the peaks in activity from the different grid modules coincide.

Figure 6A:
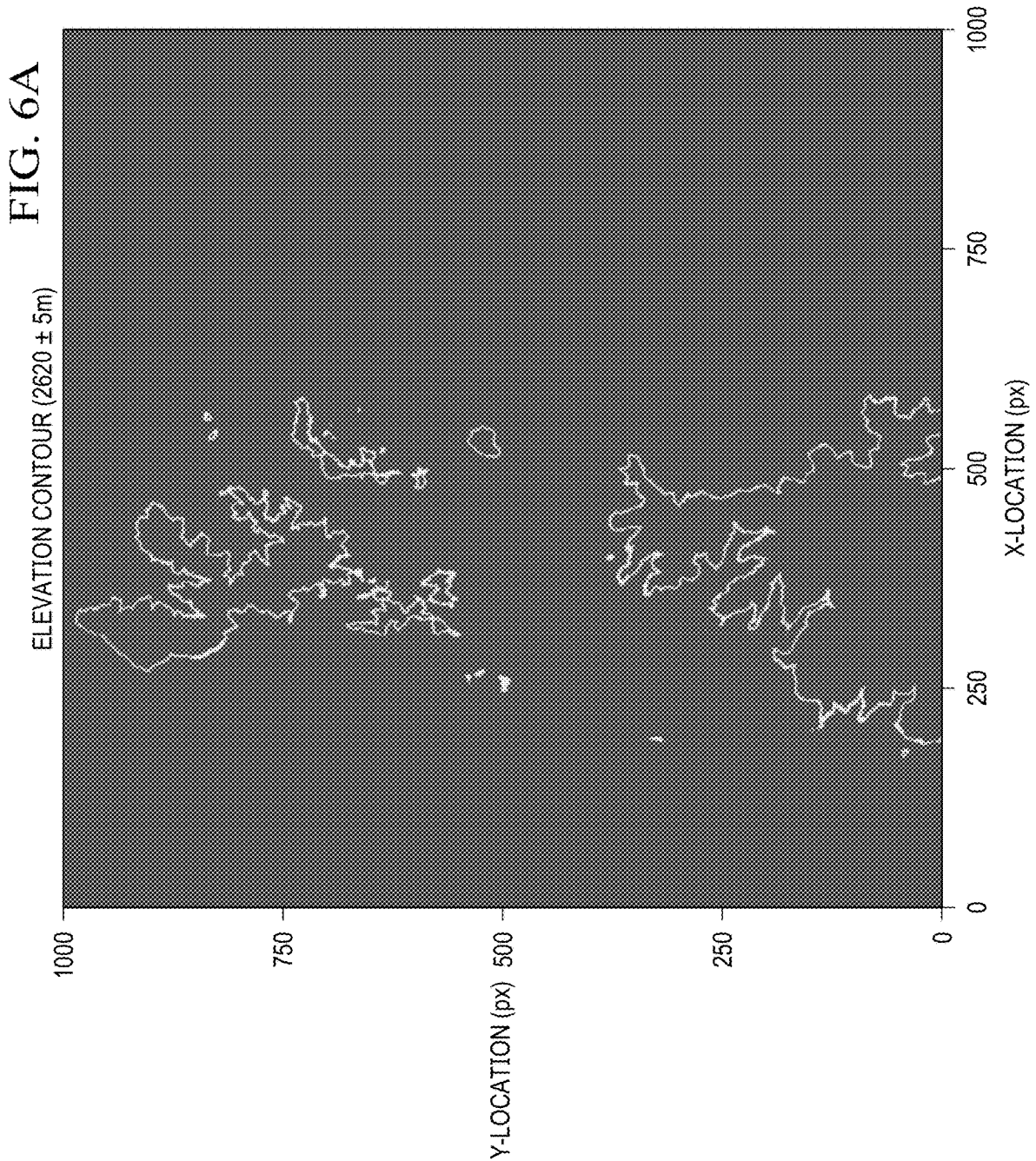
FIG. 6A depicts a contour plot of locations that fall within a given elevation interval.

While the above specification approach allows encoding and decoding to and from Cartesian coordinates and phase codes (per grid module), the inputs to the localization problem are sensory measurements as opposed to locations. This difference requires either learning or constructing a mapping that associates the sensor space, which are elevation readings in the present case, into phase space. With a reference DEM available, the mapping may be constructed deterministically by identifying the set of locations from the DEM that correspond to a given elevation. This results in a contour line of locations that fall within the given elevation, as shown in FIG. 6A. From the contour line, the transformation from Cartesian to phase space (Eqs. 1 and 2) is used to compute the offset alignment encoding, identifying the phase code for each of the locations on the contour line.

Figure 6B:
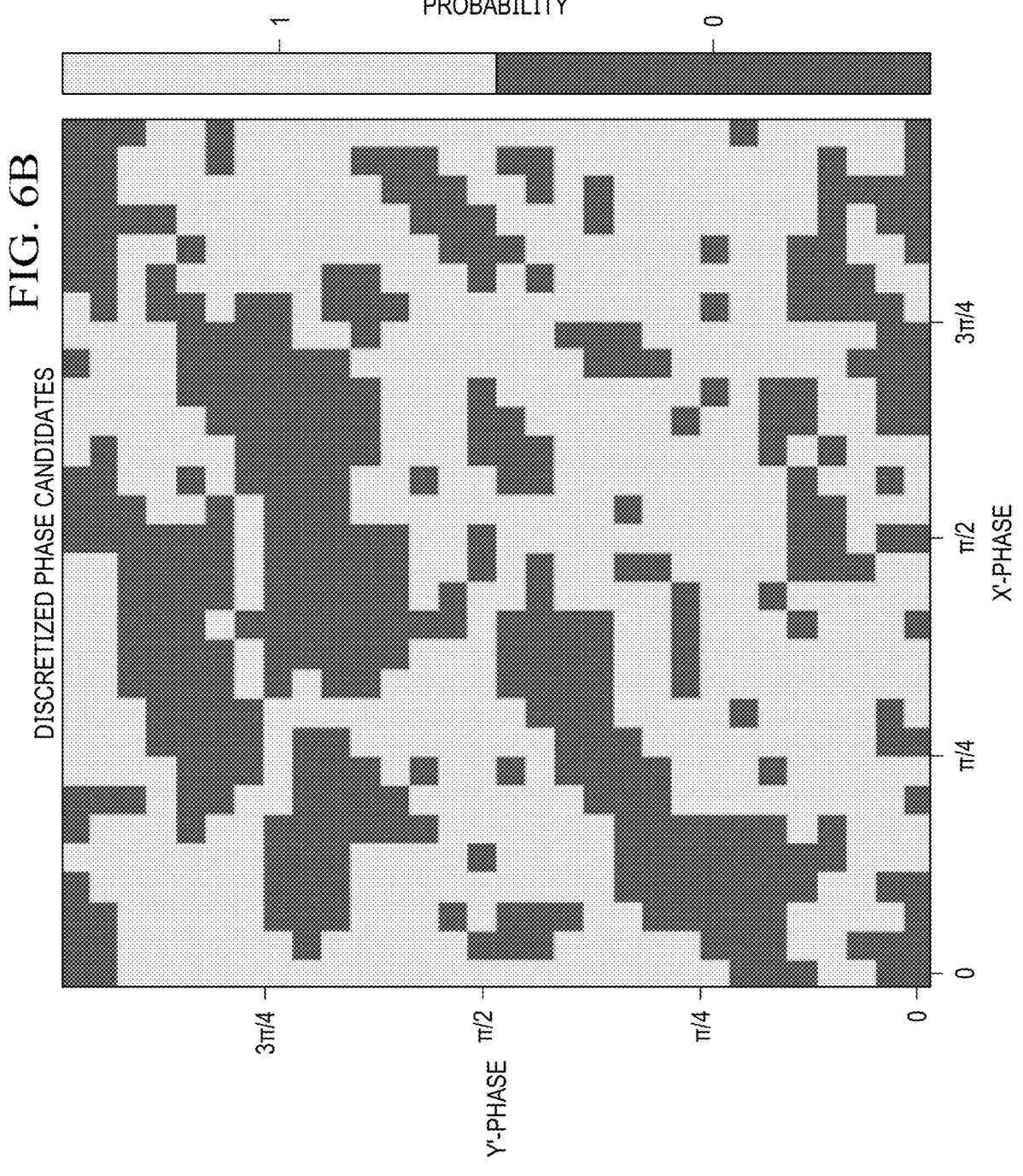
FIG. 6B depicts phase codes for a given grid module that corresponds to locations from the contour line in FIG. 6A.

FIG. 6B depicts phase codes for a given grid module that corresponds to locations from the contour line in FIG. 6A. Discretizing over the phase space produces the corresponding phases codes for the contour line for a given elevation interval, as shown in FIG. 6B. Something to note about the phase candidate plots is that the entries only take on binary values, making the mapping a possibilistic rather than probabilistic one. In code, the "possibilistic" computation is accomplished simply by taking the logical OR operation (as opposed to summing up occurrences and dividing by a normalization factor). Using this method across the elevations and grid modules allows construction of a distributed dictionary of binary matrices that are specific to a given DEM. Regarding potential neuromorphic implementation, this binary representation makes them more suitable for low-precision computation (e.g., as a spiking event) or storage (e.g., synaptic connection).

Figure 7:
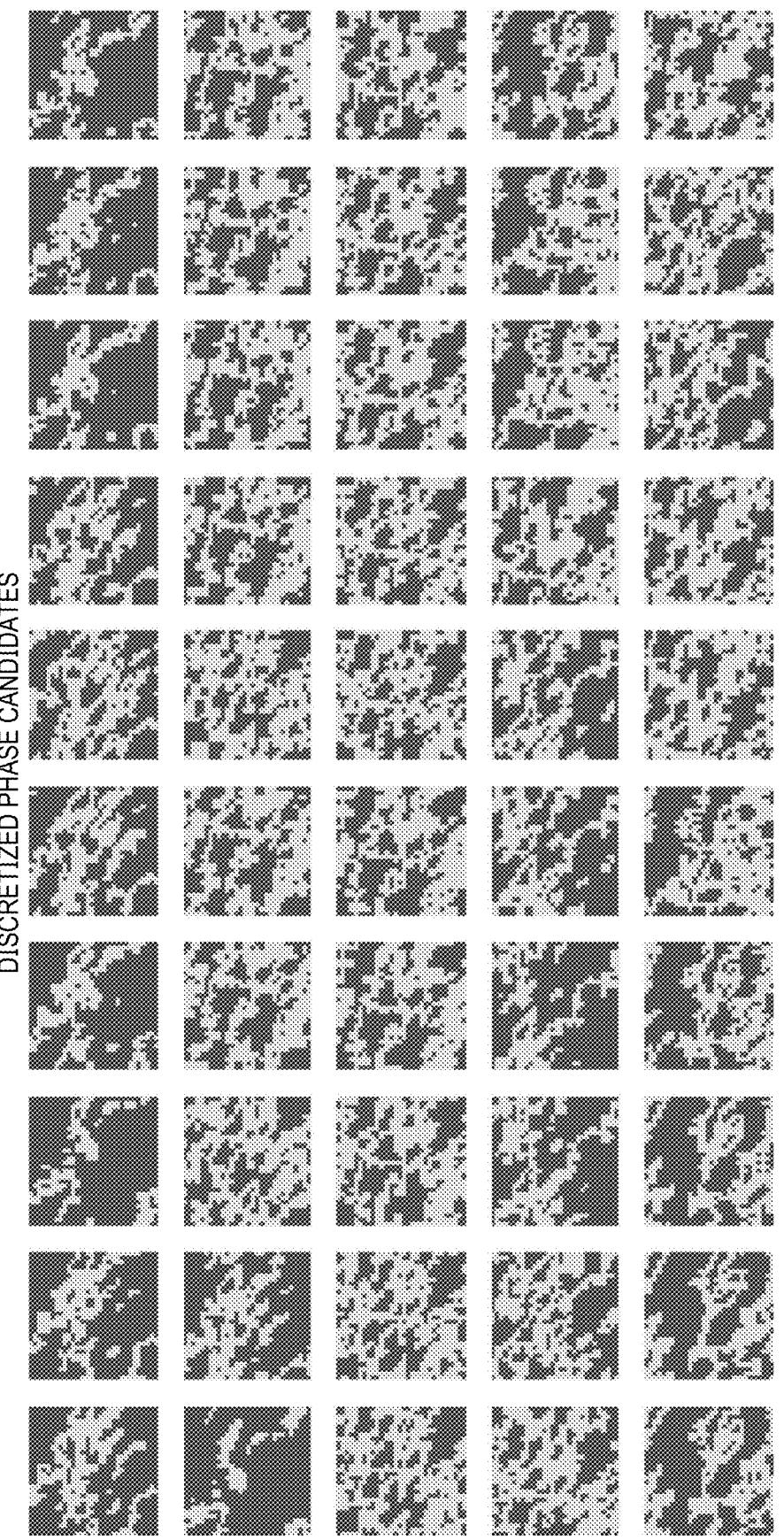
FIG. 7 illustrates displacement corrected phase candidates for a given grid module for a sample trajectory in accordance with an illustrative embodiment.

From the phase candidate plot for a given grid module and elevation there is a large set of possible phase codes that are consistent with that elevation. However, over the full trajectory of sensor inputs, the information from the multiple phase candidates may be integrated by correcting for the relative displacement between them with respect to a given reference point (e.g., the final measurement in the trajectory). It should be noted that linear displacements in the original Cartesian coordinate space corresponds to phase shifts in phase space (see Eq. 2). Because the phase space is defined over a torus, this computation is relatively straightforward (i.e., redefining the position of the origin). In an agent, the necessary odometry information may be obtained through motion sensors such as inertial measurement units (IMU). The sequence of these displacement corrected phase candidates for a given grid module for a sample trajectory is shown in FIG. 7.

Figure 8:
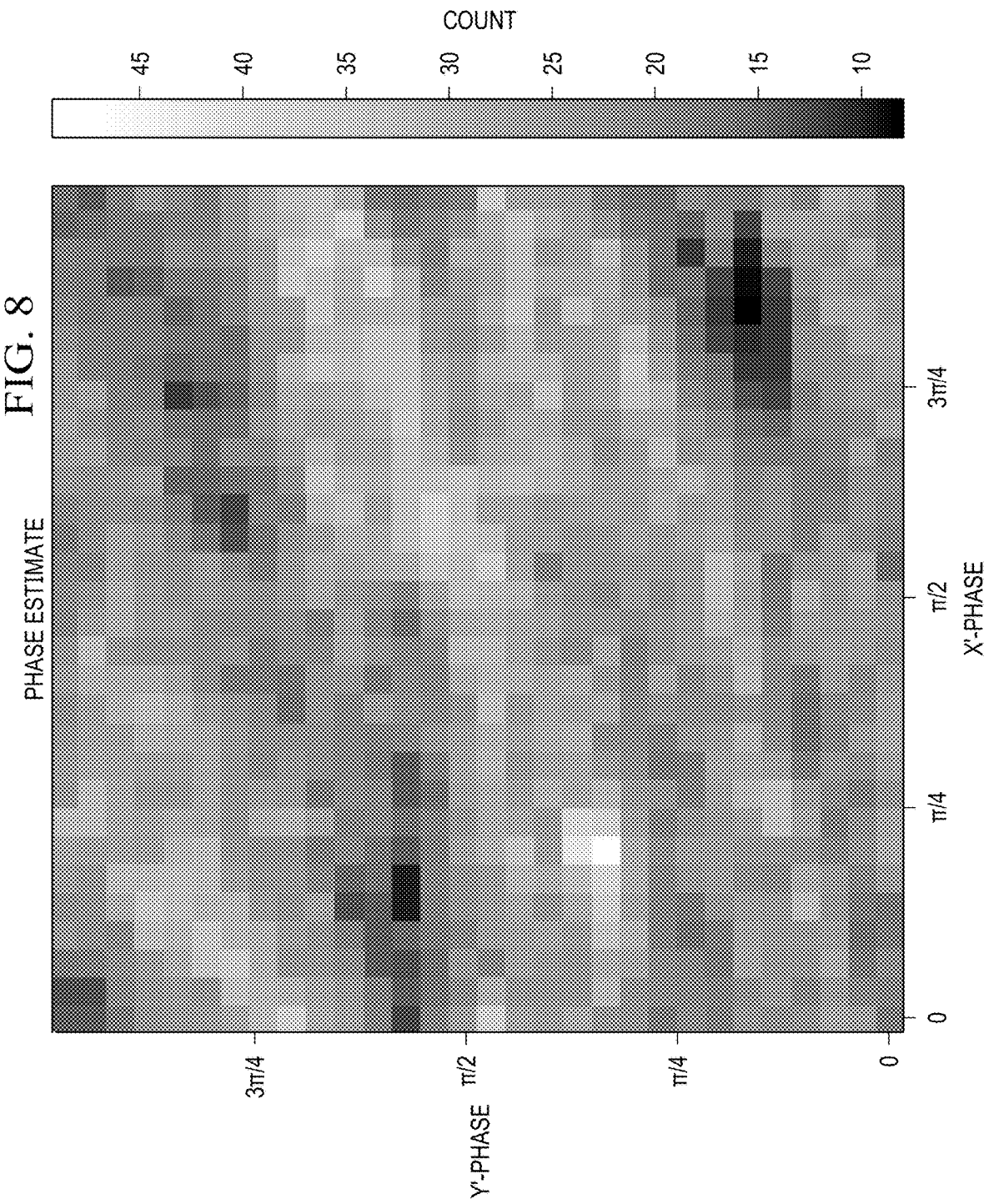
FIG. 8 illustrates a summation of displacement corrected phase candidates in accordance with an illustrative embodiment.
Figure 9:
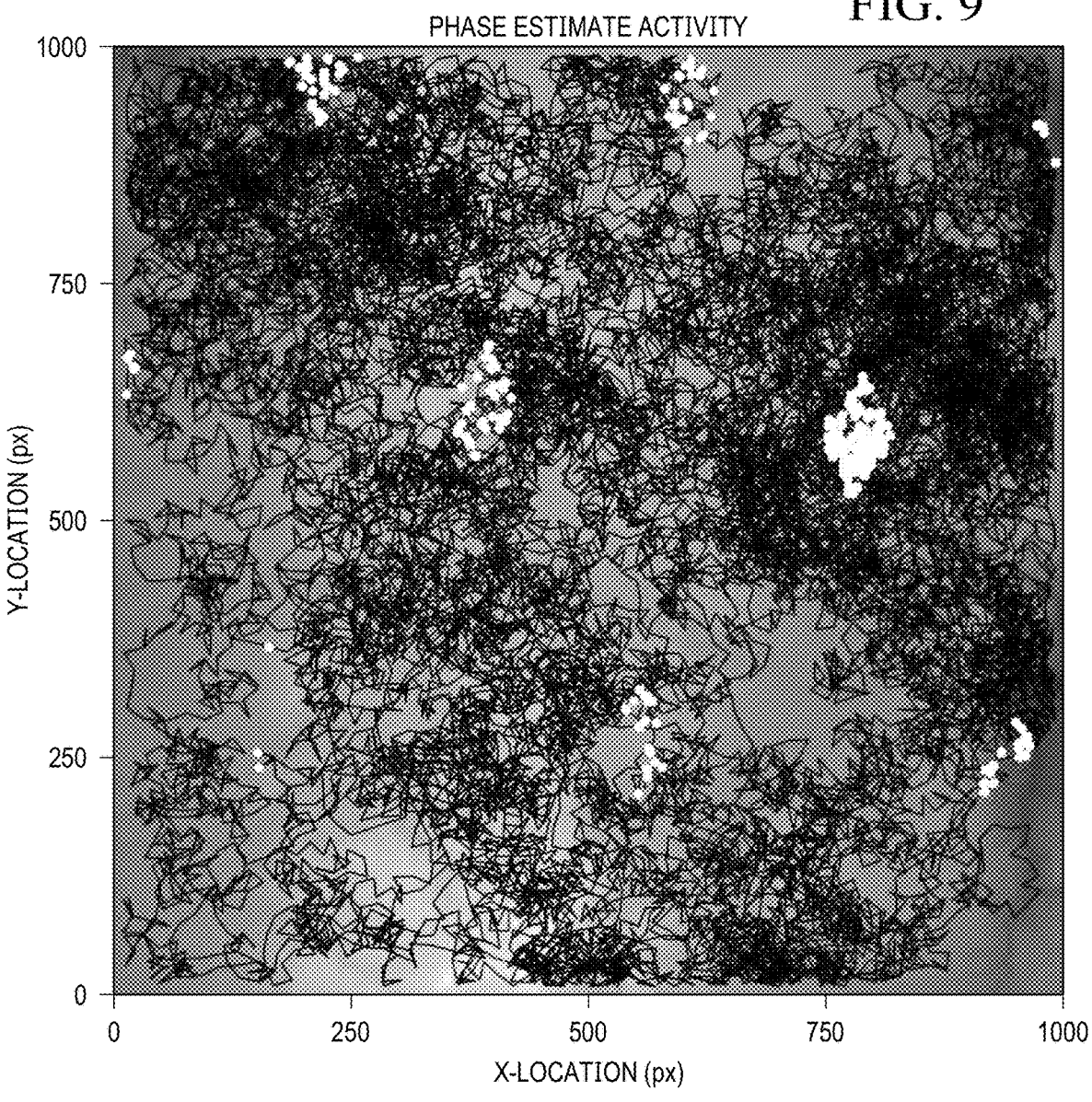
FIG. 9 illustrates locations over a random walk corresponding to phase estimates for a given grid module in accordance with an illustrative embodiment.

When these sequences of displacement corrected phase candidates are summed together, as shown in FIG. 8, they result in a plot where the discretized phase interval with the max candidate counts corresponds to a more coherent estimated phase code. Notably, when considering the response activity of a given phase interval from the phase estimate plot and comparing to their corresponding locations, for example, over a random walk as shown in FIG. 9, it resembles grid cell activity observed in rodent experiments. For potential neuromorphic implementation, the summation may be approximated by a winner-take-all circuit which connects the activity from the sensor dictionary to the phase estimate outputs. The sensor dictionary may be the dictionary of binary matrices.

Figure 10:
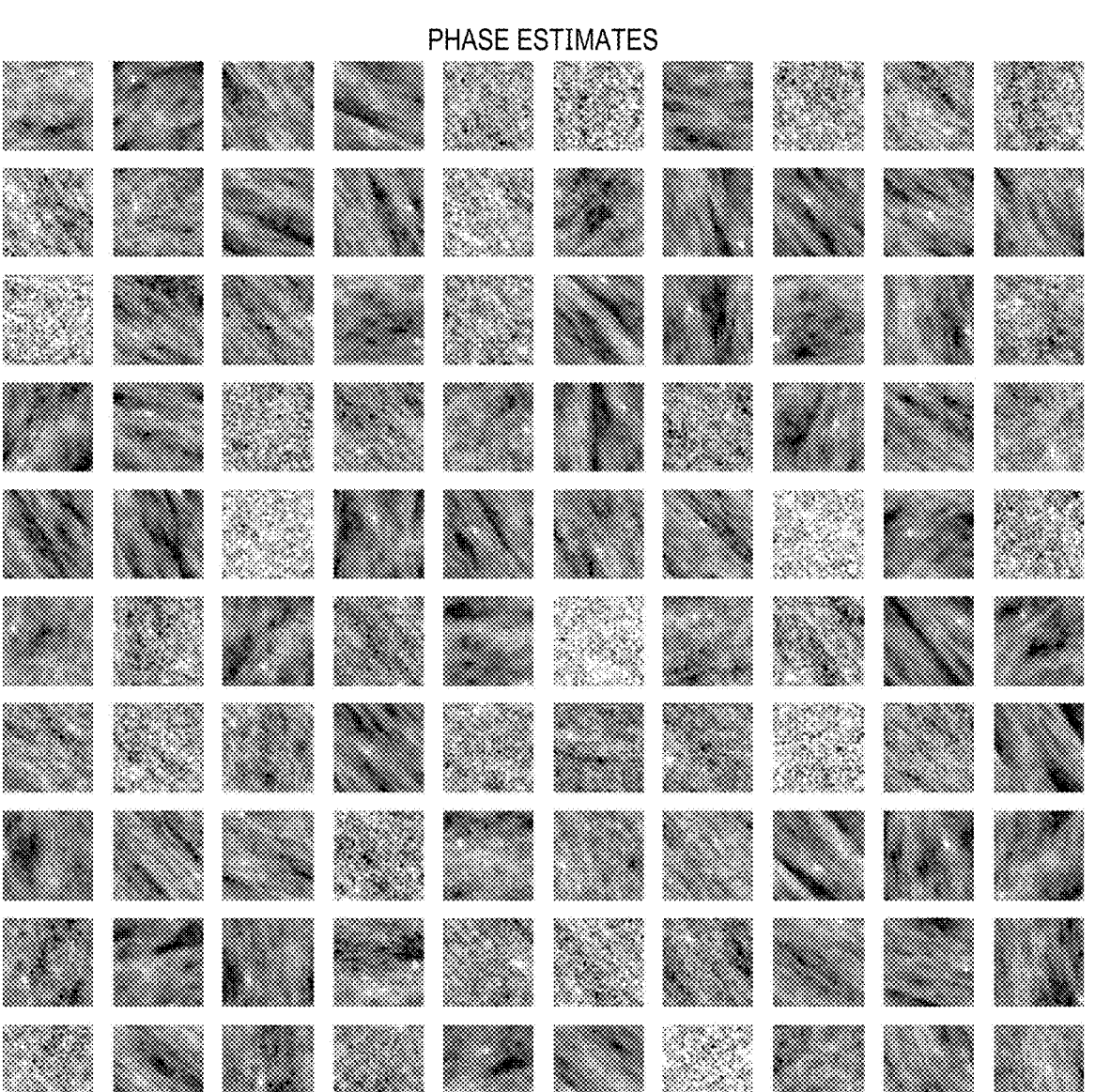
FIG. 10 illustrates summed phase candidates sample over multiple distinct grid modules in accordance with an illustrative embodiment.

A more complete set of phase estimates may be obtained by performing the above computation across multiple grid modules (each randomly selected with distinct spatial scale and orientation over the DEM). A sample of these summed phase candidates is shown in FIG. 10. One observation here is that for certain spatial scales and orientations, even the displacement corrected phase candidates are unable to adequately estimate the phase code, placing constraints on how well a given parameterization of a grid module may represent a given terrain, or requiring additional contextual information such as landmarks. Regarding potential neuromorphic implementation, the currently proposed computation is largely independent with respect to grid modules, resulting in parallel workload that should be well suited to neuromorphic systems.

Figure 11:
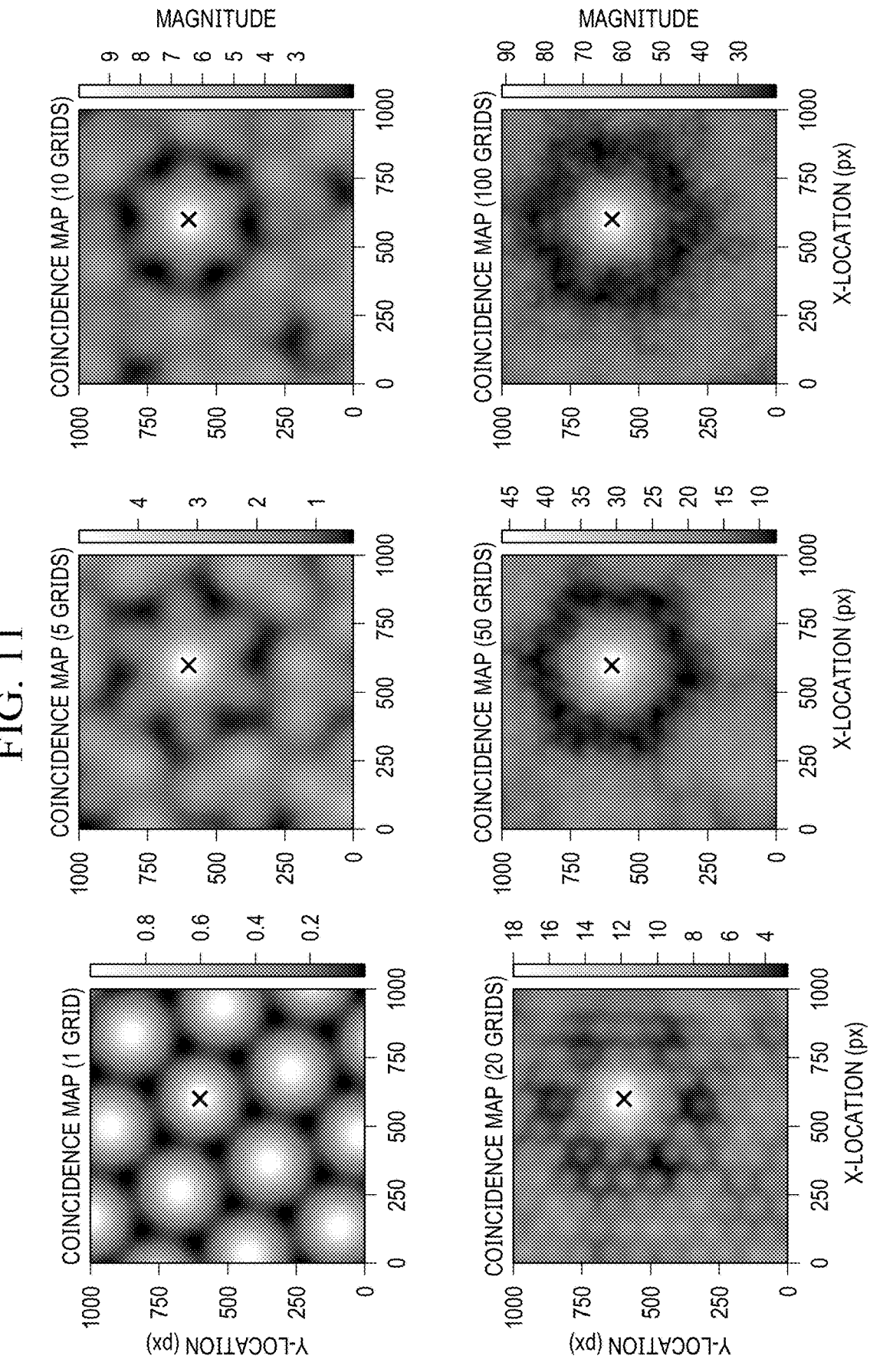
FIG. 11 depicts coincidence maps from summing offset grid cell activity at estimated phase codes in accordance with an illustrative embodiment.

From the set of phase code estimates, the coincidence map over the original DEM is computed by summing over the offset grid cell activity patterns corresponding to the phase code estimate per grid module. Sample summations are shown in FIG. 11, which illustrates that the incorporation of the phase code estimates from more grid modules yields better location estimates. Location estimate is identified by the highest magnitude, and the ground truth is marked by an 'X.'

Figure 2:
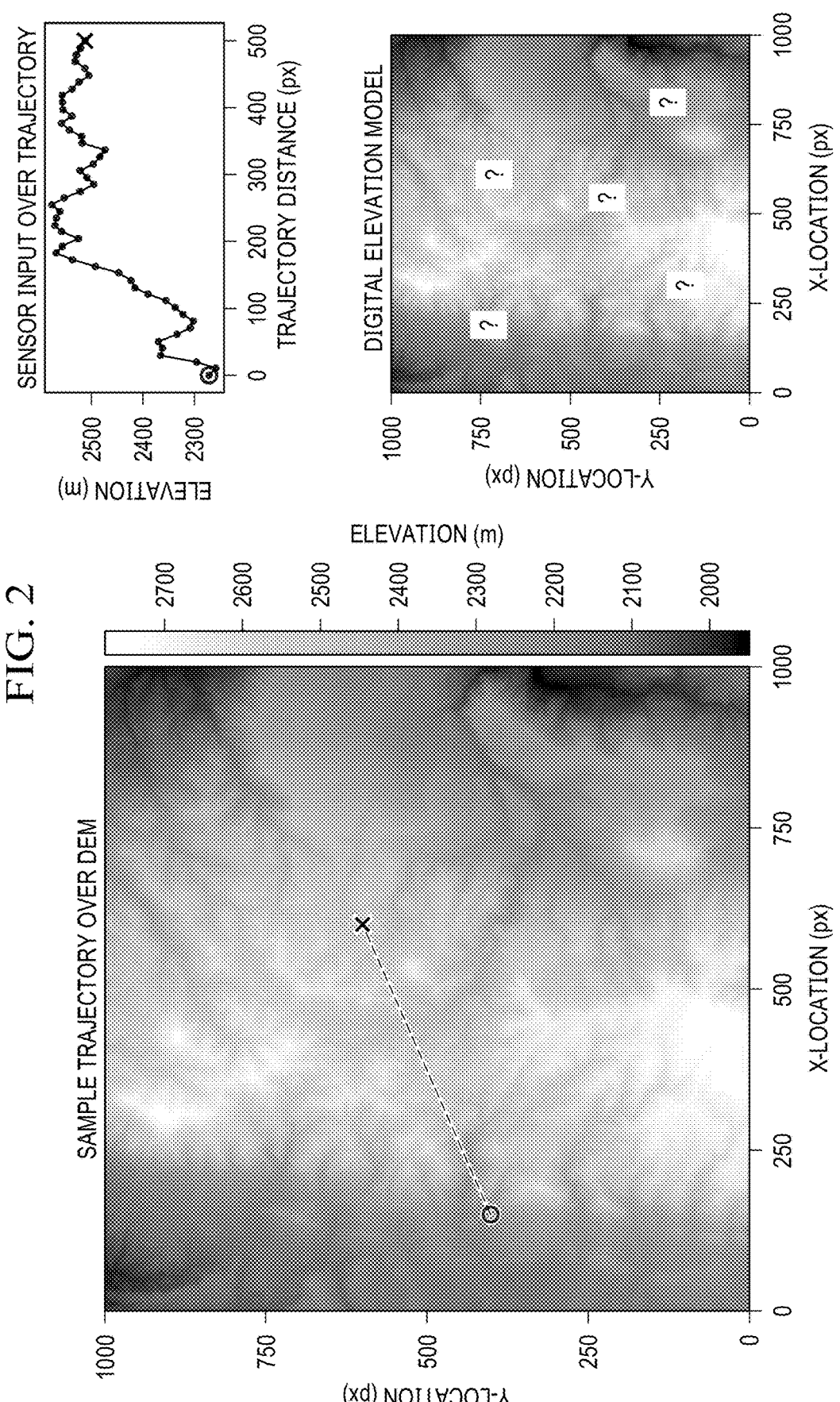
FIG. 2 illustrates the problem of estimating a location at the end of a trajectory projected on a digital elevation model.

We performed an initial localization experiment where we simulate arbitrary trajectories (such as shown in FIG. 2) and measured the localization error of the resulting estimate in terms of its linear displacement from the ground truth. Instead of any significant amount of hyperparameter tuning, as well as to demonstrate the robustness of our approach, we choose numbers that simply fall within a reasonable order of magnitude. For our DEM, we selected an area of 1,000×1,000 pixels (px), and we discretize the elevations to 1,000 intervals. We chose to generalize our spatial dimensions in this way in order to be agnostic to different DEM resolutions.

Figure 12:
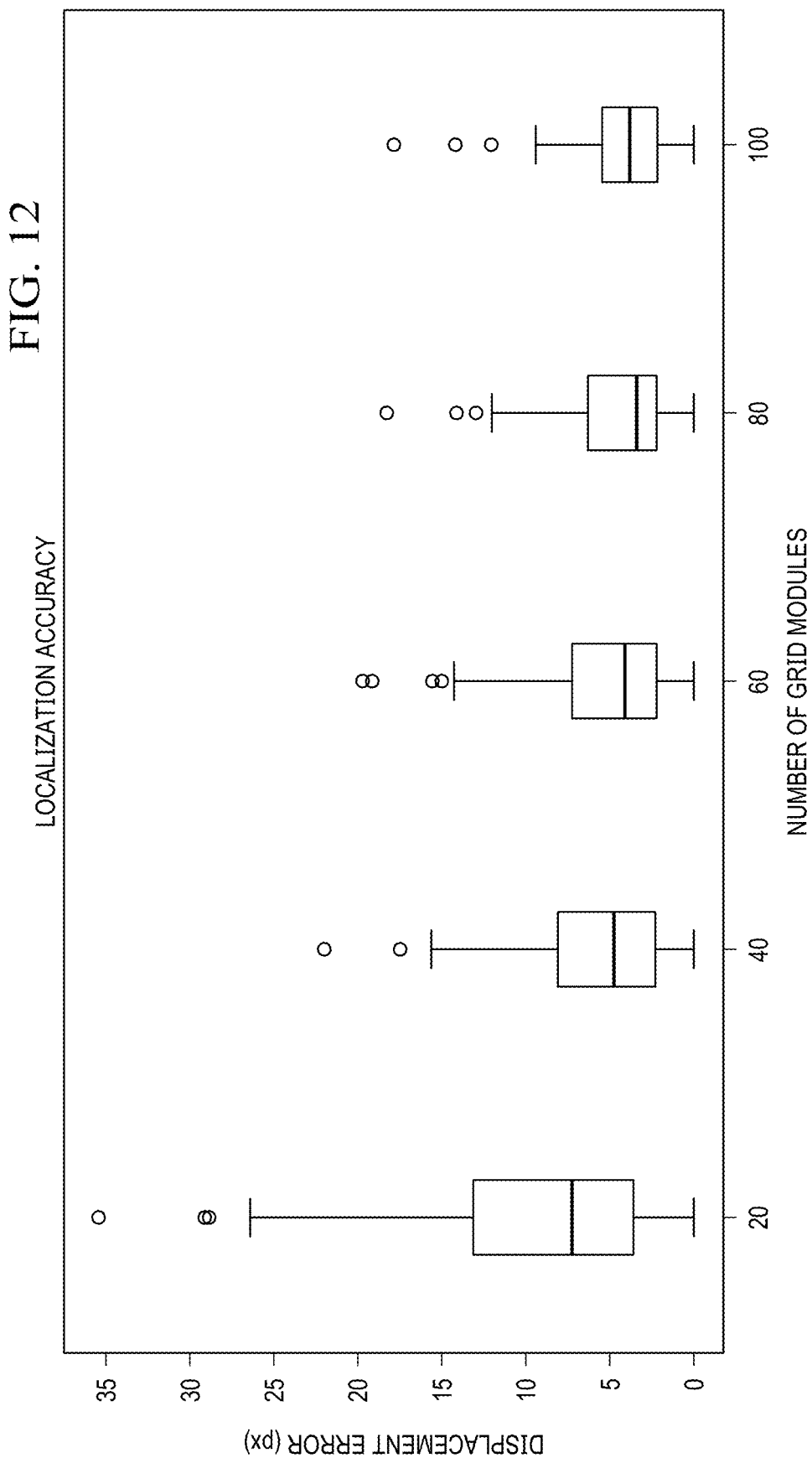
FIG. 12 illustrates error displacement of location estimate for different numbers of grid modules in accordance with an illustrative embodiment.

We then constructed a set of 1,000 grid modules with randomly chosen spatial scales $\lambda \in [50, 500]$ px and orientations $\theta \in [0, 2\pi)$. We also discretized the phase space $\phi \in [0, 2\pi)2$ to 30×30 intervals over a torus. For each trajectory, we chose a straight line interval of distance 500 px and collected 50 elevation measurements evenly spaced along its path. We randomly sampled 100 such trajectories, and we randomly selected a subset (per trial) from our set of grid modules to estimate the location corresponding to the final measurement in the trajectory. The resulting displacement error distribution is shown in FIG. 12.

Figure 13B:
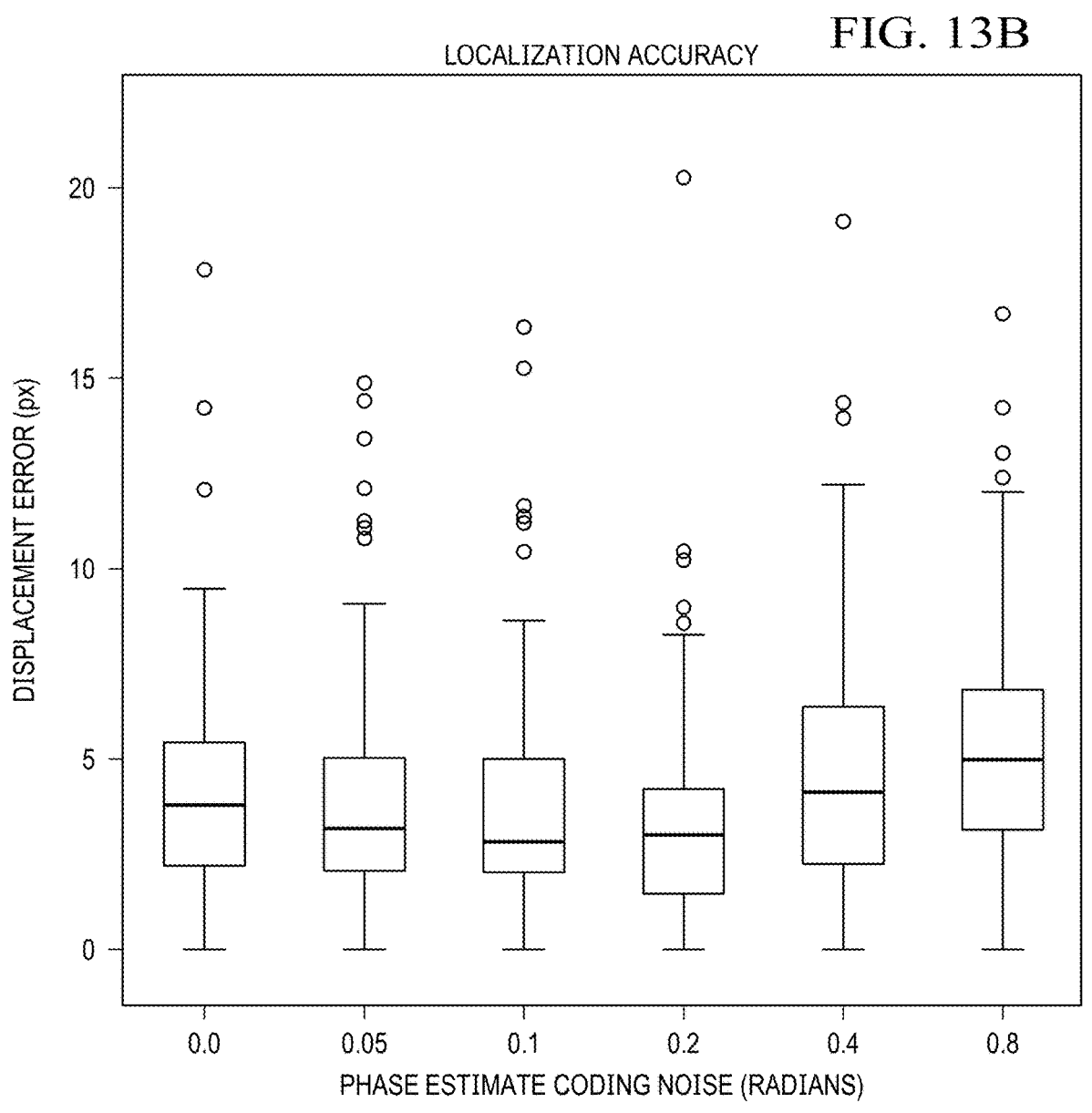
FIG. 13B illustrates displacement error distribution of location estimated relative to phase estimate coding noise.

We additionally performed some experiments introducing process noise into the algorithm. Here, we consider bit-flips in the phase candidate dictionary as well as perturbed phase estimates. Regarding potential neuromorphic implementation, the former corresponds to sensor input neurons either not firing or firing spuriously, and the latter corresponds to a winner-take-all circuit selecting adjacent phase codes. For these experiments, we used a random subset (per trial) of 100 grid modules for the estimation. The resulting displacement error distributions are shown in FIGS. 13A and 13B.

It should be noted that while most of the algorithm description is with respect to graded activations (e.g., [0,1], inclusive), for neuromorphic hardware implementations, the neurons have an all-or-nothing "spiking/firing" behavior (e.g. {0,1}).

It should be noted that, as suggested by the coincidence maps in FIG. 11, increasing the number of grid modules tends to decrease the localization error. Furthermore, due to the redundancy gained through the use of multiple grid modules, not only is the algorithm fairly robust to noise, but is an observed graceful degradation in the resulting location estimates, which is most visually apparent in the bit-flip results in FIG. 13A.

FIG. 14 depicts a flowchart illustrating a process for encoding terrain maps in accordance with an illustrative embodiment. Process 1400 can be implemented in hardware, software, or both. When implemented in software, the process can take the form of program code that is run by one or more processor units located in one or more hardware devices in one or more systems. Process 1400 might be implemented in terrain coding system 100 in FIG. 1.

Process 1400 begins by receiving a digital elevation model (DEM) of a terrain (step 1402). The DEM is encoded into a number of grid cells in a phase space parameterized by spatial scale, orientation, and 2D offset (step 1404). Grid cells with shared spatial scale and orientation are aggregated into grid modules according to spatial scale and orientation, wherein 2D offset remains a free parameter (step 1406). The 2D offset may be scaled to phases on a torus with a reference point as a corner of the DEM. Because there are multiple grid modules, each with different respective parameterizations (spatial scale and orientation), each grid module has its own phase space.

Process 1400 identifies a number of locations from the DEM that correspond to a given elevation to produce a contour line of locations that fall within the given elevation (step 1408). 2D phase codes are calculated for each grid module to produce a phase candidate dictionary (distributed DEM), wherein a subset of the 2D phase codes comprise phase candidates that correspond to locations from the contour line for the given elevation (step 1410). Calculating the 2D phase codes of the grid modules may comprise performing an affine transform of Cartesian coordinate followed by a modulo operation.

Steps 1402-1410 may be performed in advance "offline," wherein the data is static. Steps 1412-1418 below are then performed "online" during flight when there is streaming or continuous incoming data. Steps 1412-1418 may be performed for multiple trajectories and respective sensor data from which a user wishes to localize.

During flight, sensor data is received along a trajectory over the terrain, wherein the sensor data comprises elevation readings (step 1412). The phase candidate dictionary is queried based on the sensor data, wherein each grid module obtains a set of phase candidates (step 1414). The phase candidates are then corrected for relative displacement from a given reference point (step 1416). Odometry information to correct the phase candidates for relative displacement may be provided by an inertial measurement unit. Linear displacements in Cartesian coordinate space corresponds to phase shifts in the phase space according to the parameterization of the grid module phase space in question. Therefore, the same linear displacement in Cartesian space will result in different phase shifts in different phase spaces.

The corrected phase candidates are summed to produce a coincidence map over the DEM, wherein the coincidence map identifies a current location estimate over the terrain (step 1418). Summing the corrected phase candidates may comprise summing phase candidates across multiple grid modules over the DEM randomly selected with distinct spatial scale and orientation.

Process 1400 then ends.

Figure 15:
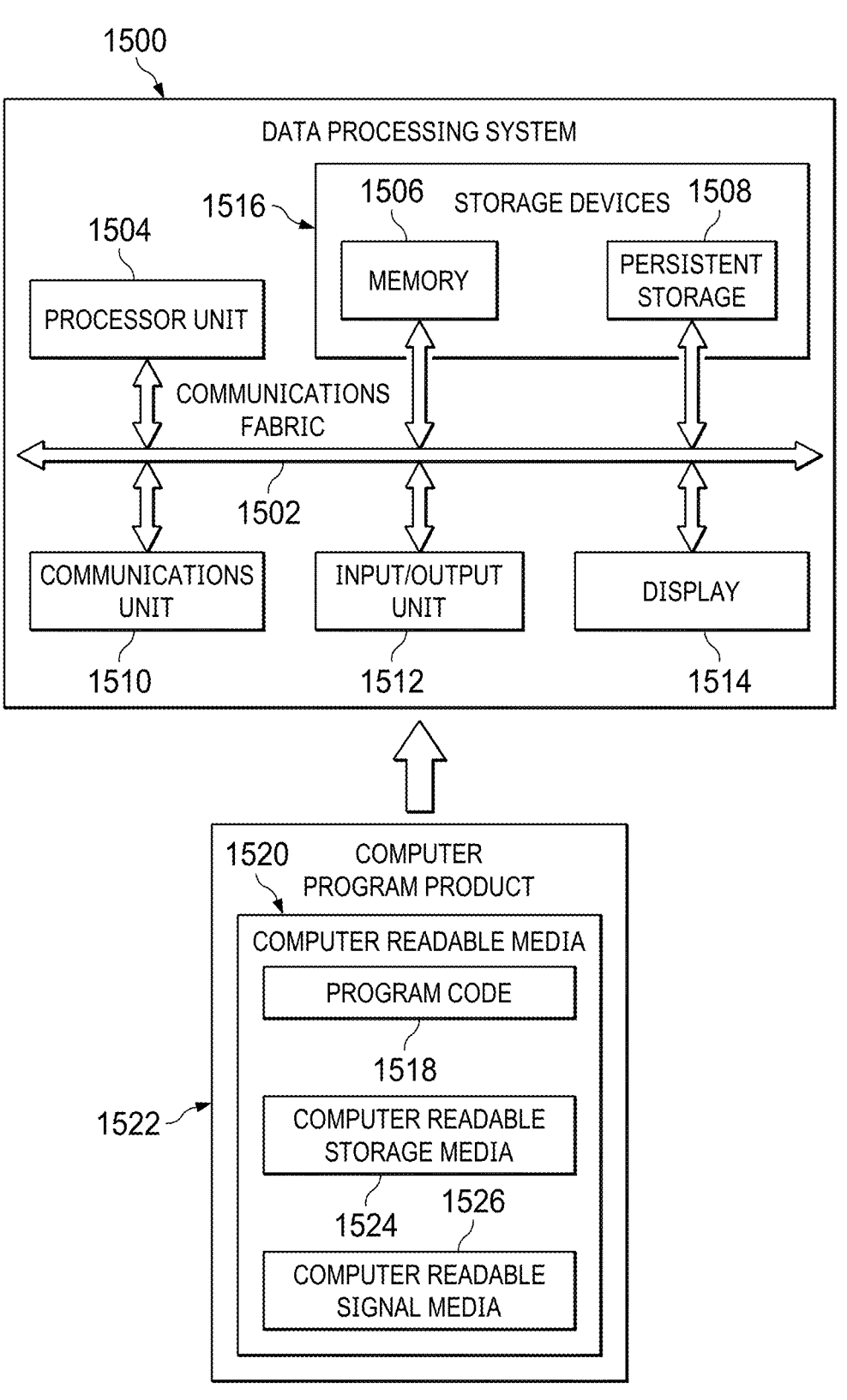
FIG. 15 is a diagram of a data processing system depicted in accordance with an illustrative embodiment.

Turning now to FIG. 15, an illustration of a block diagram of a data processing system is depicted in accordance with an illustrative embodiment. Data processing system 1500 may be used to implement computer system 150 in FIG. 1. In this illustrative example, data processing system 1500 includes communications framework 1502, which provides communications between processor unit 1504, memory 1506, persistent storage 1508, communications unit 1510, input/output unit 1512, and display 1514. In this example, communications framework 1502 may take the form of a bus system.

Processor unit 1504 serves to execute instructions for software that may be loaded into memory 1506. Processor unit 1504 may be a number of processors, a multi-processor core, or some other type of processor, depending on the particular implementation. In an embodiment, processor unit 1504 comprises one or more conventional general-purpose central processing units (CPUs). In an alternate embodiment, processor unit 1504 comprises one or more graphical processing units (GPUs).

Memory 1506 and persistent storage 1508 are examples of storage devices 1516. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 1516 may also be referred to as computer-readable storage devices in these illustrative examples. Memory 1506, in these examples, may be, for example, a random access memory or any other suitable volatile or non-volatile storage device. Persistent storage 1508 may take various forms, depending on the particular implementation.

For example, persistent storage 1508 may contain one or more components or devices. For example, persistent storage 1508 may be a hard drive, a flash memory, a rewritable optical disk, a rewritable magnetic tape, or some combination of the above. The media used by persistent storage 1508 also may be removable. For example, a removable hard drive may be used for persistent storage 1508. Communications unit 1510, in these illustrative examples, provides for communications with other data processing systems or devices. In these illustrative examples, communications unit 1510 is a network interface card.

Input/output unit 1512 allows for input and output of data with other devices that may be connected to data processing system 1500. For example, input/output unit 1512 may provide a connection for user input through at least one of a keyboard, a mouse, or some other suitable input device. Further, input/output unit 1512 may send output to a printer. Display 1514 provides a mechanism to display information to a user.

Instructions for at least one of the operating system, applications, or programs may be located in storage devices 1516, which are in communication with processor unit 1504 through communications framework 1502. The processes of the different embodiments may be performed by processor unit 1504 using computer-implemented instructions, which may be located in a memory, such as memory 1506.

These instructions are referred to as program code, computer-usable program code, or computer-readable program code that may be read and executed by a processor in processor unit 1504. The program code in the different embodiments may be embodied on different physical or computer-readable storage media, such as memory 1506 or persistent storage 1508.

Program code 1518 is located in a functional form on computer-readable media 1520 that is selectively removable and may be loaded onto or transferred to data processing system 1500 for execution by processor unit 1504. Program code 1518 and computer-readable media 1520 form computer program product 1522 in these illustrative examples. In one example, computer-readable media 1520 may be computer-readable storage media 1524 or computer-readable signal media 1526.

In these illustrative examples, computer-readable storage media 1524 is a physical or tangible storage device used to store program code 1518 rather than a medium that propagates or transmits program code 1518. Computer readable storage media 1524, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Alternatively, program code 1518 may be transferred to data processing system 1500 using computer-readable signal media 1526. Computer-readable signal media 1526 may be, for example, a propagated data signal containing program code 1518. For example, computer-readable signal media 1526 may be at least one of an electromagnetic signal, an optical signal, or any other suitable type of signal. These signals may be transmitted over at least one of communications links, such as wireless communications links, optical fiber cable, coaxial cable, a wire, or any other suitable type of communications link.

The different components illustrated for data processing system 1500 are not meant to provide architectural limitations to the manner in which different embodiments may be implemented. The different illustrative embodiments may be implemented in a data processing system including components in addition to or in place of those illustrated for data processing system 1500. Other components shown in FIG. 15 can be varied from the illustrative examples shown. The different embodiments may be implemented using any hardware device or system capable of running program code 1518.

As used herein, the phrase "a number" means one or more. The phrase "at least one of", when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, without limitation, "at least one of item A, item B, or item C" may include item A, item A and item B, or item C. This example also may include item A, item B, and item C or item B and item C. Of course, any combinations of these items may be present. In some illustrative examples, "at least one of" may be, for example, without limitation, two of item A; one of item B; and ten of item C; four of item B and seven of item C; or other suitable combinations.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks may be implemented as program code.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component may be configured to perform the action or operation described. For example, the component may have a configuration or design for a structure that provides the component an ability to perform the action or operation that is described in the illustrative examples as being performed by the component. Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A computer-implemented method of improving a robustness to noise and reduce a localization error encoding terrain maps, the method comprising using a number of processors to perform the steps of:

receiving a digital elevation model (DEM) of a terrain;

encoding the DEM into a number of grid cells in a phase space parameterized by spatial scale, orientation, and a 2D offset;

aggregating grid cells with shared spatial scale and orientation into grid modules, wherein the 2D offset remains a free parameter;

identifying a number of locations from the DEM that correspond to a given elevation to produce a contour line of locations that fall within the given elevation;

calculating 2D phase codes for each grid module to produce a phase candidate dictionary, wherein a subset of the 2D phase codes comprise phase candidates that correspond to locations from the contour line for the given elevation;

while receiving streaming sensor data along a trajectory over the terrain, wherein the sensor data comprises elevation readings, performing the steps of;

querying the phase candidate dictionary based on the sensor data, wherein each grid module obtains a set of phase candidates;

correcting the phase candidates for relative displacement from a given reference point;

summing corrected phase candidates and producing a coincidence map over the DEM; and identifying, using the coincidence map, a current location estimate over the terrain.

2. The method of claim 1, wherein the steps of receiving the sensor data, querying the phase candidate dictionary, correcting the phase candidates, and summing the corrected phase candidates are performed for multiple trajectories with respective sensor data.

3. The method of claim 1, wherein calculating the 2D phase codes of the grid modules comprises performing an affine transform of Cartesian coordinate followed by a modulo operation.

4. The method of claim 1, wherein the 2D offset may be scaled to phases on a torus with a reference point as a corner of the DEM.

5. The method of claim 1, wherein odometry information to correct the phase candidates for relative displacement is provided by an inertial measurement unit.

6. The method of claim 1, wherein summing the corrected phase candidates comprises summing phase candidates across multiple grid modules over the DEM randomly selected with distinct spatial scale and orientation.

7. The method of claim 1, wherein each grid module has its own phase space, and wherein linear displacements in Cartesian coordinate space corresponds to phase shifts in a phase space according to a parameterization of that phase space.

8. A system for configured to increase a robustness to noise and reduce a localization error in encoded terrain maps, wherein the system comprises:

a storage device that stores program instructions; and one or more processors operably connected to the storage device and configured to execute the program instructions to cause the system to:

receive a digital elevation model (DEM) of a terrain;

encode the DEM into a number of grid cells in a phase space parameterized by spatial scale, orientation, and a 2D offset;

aggregate grid cells with shared spatial scale and orientation into grid modules, wherein the 2D offset remains a free parameter;

identify a number of locations from the DEM that correspond to a given elevation to produce a contour line of locations that fall within the given elevation;

calculate 2D phase codes for each grid module to produce a phase candidate dictionary, wherein a subset of the 2D phase codes comprise phase candidates that correspond to locations from the contour line for the given elevation;

receive a stream of sensor data along a trajectory over the terrain, wherein the sensor data comprises elevation readings, and based upon the stream execute the following;

query the phase candidate dictionary based on the sensor data, wherein each grid module obtains a set of phase candidates;

correct the phase candidates for relative displacement from a given reference point;

sum corrected phase candidates and produce a coincidence map over the DEM and identify, based upon the coincidence map, a current location estimate over the terrain.

9. The system of claim 8, wherein the steps of receiving the sensor data, querying the phase candidate dictionary, correcting the phase candidates, and summing the corrected phase candidates are performed for multiple trajectories with respective sensor data.

10. The system of claim 8, wherein calculating the 2D phase codes of the grid modules comprises performing an affine transform of Cartesian coordinate followed by a modulo operation.

11. The system of claim 8, wherein the 2D offset may be scaled to phases on a torus with a reference point as a corner of the DEM.

12. The system of claim 8, wherein odometry information to correct the phase candidates for relative displacement is provided by an inertial measurement unit.

13. The system of claim 8, wherein summing the corrected phase candidates comprises summing phase candidates across multiple grid modules over the DEM randomly selected with distinct spatial scale and orientation.

14. The system of claim 8, wherein each grid module has its own phase space, and wherein linear displacements in Cartesian coordinate space corresponds to phase shifts in a phase space according to a parameterization of that phase space.

15. A computer program product configured to increase a robustness to noise and reduce a localization error in encoded terrain maps, wherein the computer program product comprises a computer-readable storage medium that comprises program instructions embodied thereon configured to perform the steps of:

receiving a digital elevation model (DEM) of a terrain;

encoding the DEM into a number of grid cells in a phase space parameterized by spatial scale, orientation, and a 2D offset;

aggregating grid cells with shared spatial scale and orientation into grid modules, wherein the 2D offset remains a free parameter;

identifying a number of locations from the DEM that correspond to a given elevation to produce a contour line of locations that fall within the given elevation;

calculating 2D phase codes for each grid module to produce a phase candidate dictionary, wherein a subset of the 2D phase codes comprise phase candidates that correspond to locations from the contour line for the given elevation;

while receiving streaming sensor data along a trajectory over the terrain, wherein the sensor data comprises elevation readings, performing the steps of;

querying the phase candidate dictionary based on the sensor data, wherein each grid module obtains a set of phase candidates;

correcting the phase candidates for relative displacement from a given reference point;

summing corrected phase candidates and producing a coincidence map over the DEM; and identifying, using the coincidence map, a current location estimate over the terrain.

16. The computer program product of claim 15, wherein the steps of receiving the sensor data, querying the phase candidate dictionary, correcting the phase candidates, and summing the corrected phase candidates are performed for multiple trajectories with respective sensor data.

17. The computer program product of claim 15, wherein calculating the 2D phase codes of the grid modules comprises performing an affine transform of Cartesian coordinate followed by a modulo operation.

18. The computer program product of claim 15, wherein the 2D offset may be scaled to phases on a torus with a reference point as a corner of the DEM.

19. The computer program product of claim 15, wherein odometry information to correct the phase candidates for relative displacement is provided by an inertial measurement unit.

20. The computer program product of claim 15, wherein summing the corrected phase candidates comprises summing phase candidates across multiple grid modules over the DEM randomly selected with distinct spatial scale and orientation.

\* \* \* \* \*